(12) United States Patent
Agrawal et al.

(10) Patent No.: US 11,916,840 B2
(45) Date of Patent: Feb. 27, 2024

(54) METHODS AND APPARATUS FOR TRANSPORT PROTOCOL ACK AGGREGATION

(71) Applicant: QUALCOMM Incorporated, San Diego, CA (US)

(72) Inventors: Prachi Agrawal, Hyderabad (IN); Arnaud Meylan, San Diego, CA (US); Vandit Pinal Desai, Dahanu Road (IN); Rajashekar Chilla, San Diego, CA (US); Prasad Gadde, Hyderabad (IN); Hariharan Subramanian, Hyderabad (IN); Vamsi Dokku, San Diego, CA (US); Ryan Michael Chapman, La Jolla, CA (US); Subash Abhinov Kasiviswanathan, Erie, CO (US); Sean Nicholas Tranchetti, Boulder, CO (US); Raul Martinez, San Diego, CA (US); Conner Austin Huff, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 233 days.

(21) Appl. No.: 16/790,398

(22) Filed: Feb. 13, 2020

(65) Prior Publication Data

US 2020/0266955 A1   Aug. 20, 2020

Related U.S. Application Data

(60) Provisional application No. 62/806,602, filed on Feb. 15, 2019.

(51) Int. Cl.
*H04L 5/00* (2006.01)
*H04L 69/16* (2022.01)
*H04W 72/08* (2009.01)

(52) U.S. Cl.
CPC ............ *H04L 5/0055* (2013.01); *H04L 69/16* (2013.01); *H04W 72/085* (2013.01)

(58) Field of Classification Search
None
See application file for complete search history.

(56) References Cited

U.S. PATENT DOCUMENTS 7,412,488 B2   8/2008   Jha et al.
7,826,487 B1   11/2010  Mukerji et al.
9,531,504 B1   12/2016  Shah et al.
(Continued)

OTHER PUBLICATIONS

International Search Report and Written Opinion—PCT/US2020/018386—ISA/EPO—dated May 18, 2020.
(Continued)

*Primary Examiner* — Jenkey Van
(74) *Attorney, Agent, or Firm* — Sevan Savsa; ArentFox Schiff LLP

(57) ABSTRACT

Aspects of the present disclosure include methods, apparatuses, and computer readable media for receiving at least one TP packet, computing a current data rate or an end time of a low throughput phase, determining if TP is in the low throughput phase, aggregating the at least one received TP packet or an ACK relating to the at least one received TP packet in response to determining that the TP is not in the low throughput phase, and transmitting the ACK to a sending device.

26 Claims, 10 Drawing Sheets

(56) References Cited

U.S. PATENT DOCUMENTS

| | | |
|---|---|---|
| 10,009,141 B2 | 6/2018 | Choi |
| 2007/0008884 A1 | 1/2007 | Tang |
| 2007/0014246 A1 | 1/2007 | Aloni et al. |
| 2007/0091894 A1 | 4/2007 | Kang et al. |
| 2012/0155408 A1 | 6/2012 | Pedersen et al. |
| 2014/0112322 A1* | 4/2014 | Ram .................. H04W 28/065 370/338 |
| 2017/0099231 A1* | 4/2017 | Li ........................... H04L 47/30 |
| 2017/0171069 A1* | 6/2017 | Oren .................. H04W 28/065 |
| 2018/0227088 A1 | 8/2018 | Bhattad et al. |
| 2019/0297020 A1 | 9/2019 | Mudireddy et al. |
| 2020/0275525 A1* | 8/2020 | Eriksson .................. H04L 1/18 |

OTHER PUBLICATIONS

Zhao-Juan Y., et al., "Research on UDP-Based High-Speed Network Transport Protocols", Application Research of Computers, Oct. 2013, vol. 30, No. 10, pp. 2887-2890.

* cited by examiner

METHODS AND APPARATUS FOR TRANSPORT PROTOCOL ACK AGGREGATION

CROSS-REFERENCE TO RELATED APPLICATIONS

The current application claims the benefit to U.S. Provisional Application No. 62/806,602, filed on Feb. 15, 2019, entitled "METHODS AND APPARATUS FOR TRANSPORT PROTOCOL ACK COALESCING," the contents of which are incorporated by reference in their entireties.

BACKGROUND

Aspects of the present disclosure relate generally to wireless communications, and more particularly, to apparatus and methods for implementing transmission control protocol (TCP) acknowledgement (ACK) between a sending device and a receiving device.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

Networks enable computers and other devices to communicate. For example, networks can carry data representing video, audio, e-mail, and so forth. Typically, data sent across a network is carried by smaller messages known as packets. By analogy, a packet is much like an envelope you drop in a mailbox. A packet typically includes "payload" and a "header". The packet's "payload" is analogous to the letter inside the envelope. The packet's "header" is much like the information written on the envelope itself. The header can include information to help network devices handle the packet appropriately.

A number of network protocols may cooperate to handle the complexity of network communications. For example, TCP may provide applications with mechanisms for transferring data across a network. To provide these services, TCP may operate on packets known as segments. Generally, a TCP segment travels across a network encapsulated by a larger packet such as an Internet Protocol (IP) packet. The payload of a TCP segment may carry a portion of the data sent across the network by an application. A receiving device may restore the original stream of data by reassembling the received TCP segments. To accomplish reassembly and ACK of received data segments back to the sending device, TCP associates a sequence number with each portion (e.g., packet) of the data. The ACKs may include information indicating to the sending device the successful receptions and/or decoding of the corresponding data segments, or the failed receptions and/or decoding (e.g., failure due to lost/missing data segments, corrupted/incomplete data segments) by the receiving device. When waiting for lost/missing data segments, the receiving device may wait for the expiration of a predetermined period of time before sending the ACK indicating lost/missing segments. TCP may send ACKs at a nominal rate, for instance one ACK every two TCP segments. This may result in some overhead associated with ACKing. In addition ACKing may require power expenditure at the mobile device in order to transmit the ACKs over the air. In some instances it may be desirable to reduce the overhead associated with ACKing, which may be done by using ACK aggregation.

In a communication network, a receiving device, such as a base station (BS) or a user equipment (UE), may transmit one or more aggregated TCP ACKs to a sending device, such as another BS or another UE, in order to reduce the overall data transmitted. Coalescing/aggregating ACKs may include receiving N TCP packets and transmitting less than N ACKs. However, certain files may not be suitable for TCP ACK aggregation due to the size of each of the files, transmission rates, or other factors. Therefore, improvements in TCP ACK aggregation may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure include methods for receiving at least one transport protocol TP packet, computing a current data rate or an end time of a low throughput phase, determining if TP is in the low throughput phase by comparing the current data rate to a threshold data rate or comparing a current time to the end time of the low throughput phase, aggregating the at least one received TP packet or an ACK relating to the at least one received TP packet in response to determining that the TP is not in the low throughput phase, and transmitting the ACK to a sending device.

Other aspects of the present disclosure include a UE having a memory, a transceiver, and one or more processors operatively coupled with the memory and the transceiver, the one or more processors configured to perform the steps of receiving at least one transport protocol TP packet, computing a current data rate or an end time of a low throughput phase, determining if TP is in the low throughput phase by comparing the current data rate to a threshold data rate or comparing a current time to the end time of the low throughput phase, aggregating the at least one received TP packet or an ACK relating to the at least one received TP packet in response to determining that the TP is not in the low throughput phase, and transmitting the ACK to a sending device.

An aspect of the present disclosure includes a UE including means for receiving at least one transport protocol TP packet, means for computing a current data rate or an end time of a low throughput phase, means for determining if TP is in the low throughput phase by comparing the current data rate to a threshold data rate or comparing a current time to the end time of the low throughput phase, means for aggregating the at least one received TP packet or an ACK relating to the at least one received TP packet in response to determining that the TP is not in the low throughput phase, and means for transmitting the ACK to a sending device Some aspects of the present disclosure include non-transitory computer readable media having instructions stored therein that, when executed by one or more processors of a UE, cause the one or more processors to perform the steps of receiving at least one transport protocol TP packet, computing a current data rate or an end time of a low throughput phase, determining if TP is in the low throughput phase by comparing the current data rate to a threshold data rate or comparing a current time to the end time of the low throughput phase, aggregating the at least one received TP packet or an ACK relating to the at least one received TP packet in response to determining that the TP is not in the low throughput phase, and transmitting the ACK to a sending device.

An aspect includes a method of wireless communication by a receiving device, comprising temporarily suspending aggregation of received information relating to at least one received communication packet in response to a determination indicating that a data transmission is in a first state. The method further includes transmitting at least one acknowledgement (ACK) to a sending device, the at least one ACK being based, at least in part, on the received information.

Another example implementation includes an apparatus for wireless communication by a receiving device, comprising a memory and a processor in communication with the memory. The processor is configured to temporarily suspend aggregation of received information relating to at least one received communication packet in response to a determination indicating that a data transmission is in a first state. The processor is further configured to transmit at least one acknowledgement (ACK) to a sending device, the at least one ACK being based, at least in part, on the received information.

Another example implementation includes an apparatus for wireless communication by a receiving device, comprising temporarily means for suspending aggregation of received information relating to at least one received communication packet in response to a determination indicating that a data transmission is in a first state. The apparatus further includes means for transmitting at least one acknowledgement (ACK) to a sending device, the at least one ACK being based, at least in part, on the received information.

Another example implementation includes a computer-readable medium comprising stored instructions for wireless communication by a receiving device, executable by a processor to temporarily suspend aggregation of received information relating to at least one received communication packet in response to a determination indicating that a data transmission is in a first state. The instructions are further executable to transmit at least one acknowledgement (ACK) to a sending device, the at least one ACK being based, at least in part, on the received information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
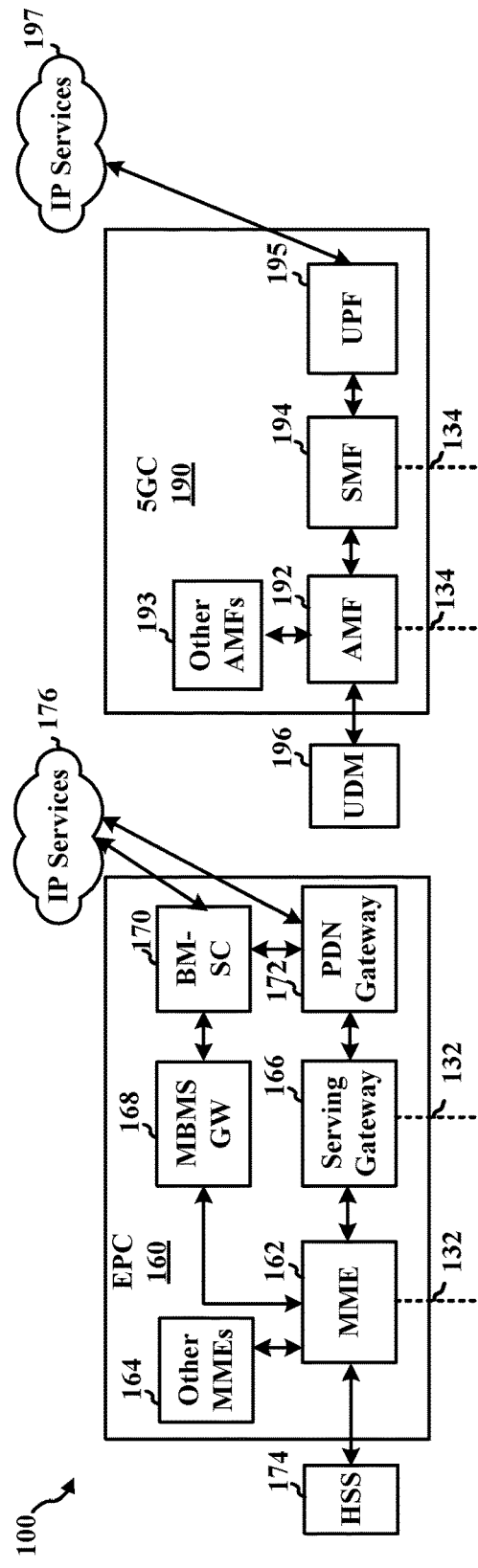
FIG. 1 is a diagram illustrating an example of a wireless communications system and an access network.
Figure 1:
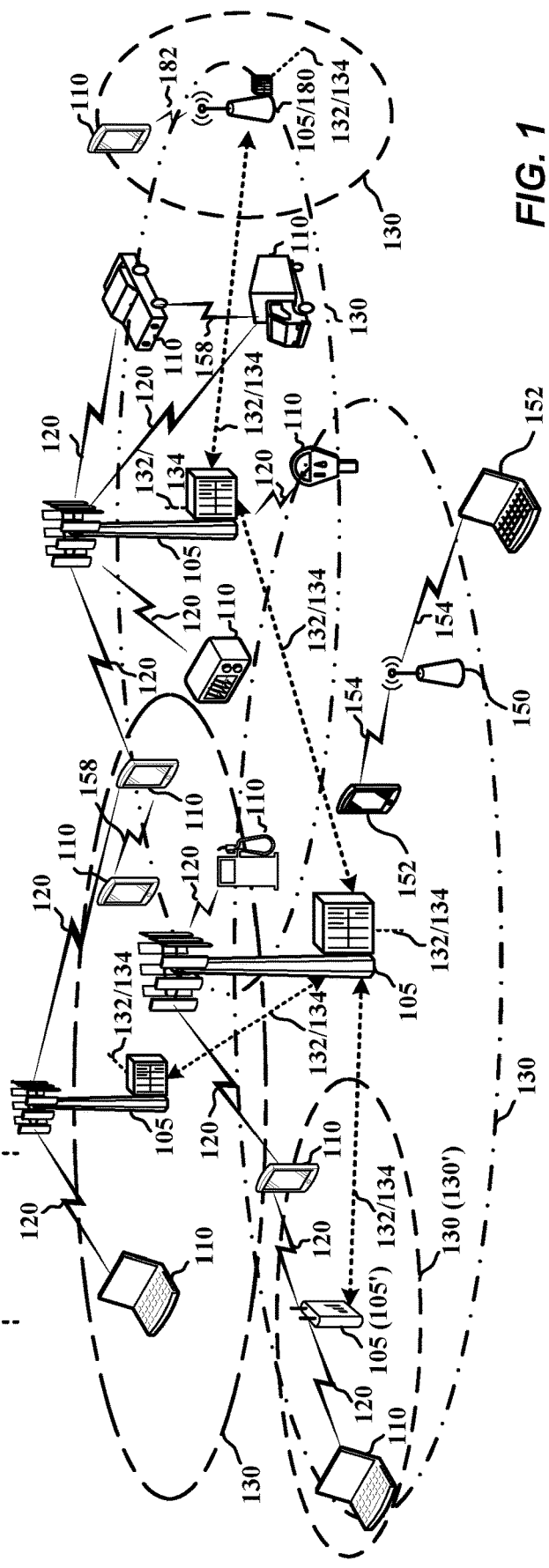

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

ACK aggregation may mitigate system overload for data throughput due to per packet processing and/or network congestion. One goal of ACK aggregation is to reduce bandwidth consumed by ACKs (e.g., uplink (UL) capacity for 5G). Further, ACK aggregation may reduce power of the receiving device by reducing transmissions of ACKs. During the slow start process, TCP throughput may be impacted as congestion window may grow by 1 maximum segment size (MSS) for every ACK received, instead of the amount of bytes acknowledged. Slow start may be a congestion control strategy used by TCP to avoid sending more data than the network is capable of forwarding. During the congestion avoidance phase, TCP cubic throughput may not be impacted by ACK aggregation. The inventors of this application have advantageously found that while downloading large files, the effect of increasing the congestion window may not significantly impact the overall throughput. However, while downloading small files (i.e., the file transfer duration is comparable to the slow start time), TCP ACK aggregation during the initial phase of the downloading process may negatively impact the throughput by a considerable amount because of the low number of ACKs during the aggregation wait period. Thus, the inventors have advantageously determined that for downloading small files, not implementing ACK aggregation may result in faster download. In an aspect of the current disclosure, ACK aggregation may begin after the end of the slow start phase. An advantage of the ACK aggregation process may include decreasing transmission overhead associated with transmitting ACKs. By utilizing ACK aggregation, the communication channel between the sending device and the receiving device may allocate more resources to data transmission rather than ACK transmission. Further, the receiving device may enable aggregation sometime after establishing TCP flow. The slow start phase duration may be estimated based on smooth round-trip time (sRTT), MSS, and/or throughput. Some aspects of the present disclosure may help reduce the impact of TCP ACK aggregation for small files.

In some aspects of the present disclosure, the UE may postpone ACK aggregation in the low throughput phase (e.g., slow start phase). For example, the UE may determine, based on the calculated current data rate and/or duration of the low throughput phase, that the UE is in the low throughput phase. While in the low throughput phase, the UE may suspend ACK aggregation in order to speed up the transmission rate of the packet of the sending device (e.g., BS). Once the UE is no longer in the low throughput phase, the UE may begin ACK aggregation because the transmission rate has reached a desirable threshold.

FIG. 1 is a diagram illustrating an example of a wireless communications system and an access network 100. The wireless communications system (also referred to as a wireless wide area network (WWAN)) includes at least one BS 105, UEs 110, an Evolved Packet Core (EPC) 160, and a 5G Core (5GC) 190. The BS 105 may include macro cells (high power cellular base station) and/or small cells (low power cellular base station). The macro cells include base stations. The small cells include femtocells, picocells, and microcells.

A BS 105 configured for 4G LTE (collectively referred to as Evolved Universal Mobile Telecommunications System (UMTS) Terrestrial Radio Access Network (E-UTRAN)) may interface with the EPC 160 through backhaul links interfaces 132 (e.g., S1, X2, Internet Protocol (IP), or flex interfaces). A BS 105 configured for 5G NR (collectively referred to as Next Generation RAN (NG-RAN)) may interface with 5GC 190 through backhaul links interfaces 134 (e.g., S1, X2, Internet Protocol (IP), or flex interface). In addition to other functions, the BS 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The BS 105 may communicate directly or indirectly (e.g., through the EPC 160 or 5GC 190) with each other over the backhaul links interfaces 132, 134. The backhaul links 132, 134 may be wired or wireless.

The BS 105 may wirelessly communicate with the UEs 110. Each of the BS 105 may provide communication coverage for a respective geographic coverage area 130. There may be overlapping geographic coverage areas 130. For example, the small cell 105' may have a coverage area 130' that overlaps the coverage area 130 of one or more macro BS 105. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the BS 105 and the UEs 110 may include uplink (UL) (also referred to as reverse link) transmissions from a UE 110 to a BS 105 and/or downlink (DL) (also referred to as forward link) transmissions from a BS 105 to a UE 110. The communication links 120 may use multiple-input and multiple-output (MIMO) antenna technology, including spatial multiplexing, beamforming, and/or transmit diversity. The communication links may be through one or more carriers. The BS 105/UEs 110 may use spectrum up to Y MHz (e.g., 5, 10, 15, 20, 100, 400, etc. MHz) bandwidth per carrier allocated in a carrier aggregation of up to a total of $Y_x$ MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 105' may operate in a licensed and/or an unlicensed frequency spectrum. When operating in an unlicensed frequency spectrum, the small cell 105' may employ NR and use the same 5 GHz unlicensed frequency spectrum as used by the Wi-Fi AP 150. The small cell 105', employing NR in an unlicensed frequency spectrum, may boost coverage to and/or increase capacity of the access network.

A BS 105, whether a small cell 105' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 110. When the gNB 180 operates in mmW or near mmW frequencies, the gNB 180 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave.

Communications using the mmW/near mmW radio frequency band has extremely high path loss and a short range. The mmW base station 180 may utilize beamforming 182 with the UE 110 to compensate for the path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway (GW) 172. The MME 162 may be in communication with a Home Subscriber Server (HSS) 174. The MME 162 is the control node that processes the signaling between the UEs 110 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the BS 105 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The BS 105 may also be referred to as a gNB, Node B, evolved Node B (eNB), an access point, a base transceiver station, a radio base station, an access point, an access node, a radio transceiver, a NodeB, eNodeB (eNB), gNB, Home NodeB, a Home eNodeB, a relay, a transceiver function, a basic service set (BSS), an extended service set (ESS), a transmit reception point (TRP), or some other suitable terminology. The BS 105 provides an access point to the EPC 160 or 5GC 190 for a UE 110. Examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 110 may be referred to as Internet of Things (IoT) devices (e.g., parking meter, gas pump, toaster, vehicles, heart monitor, etc.). The UE 110 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
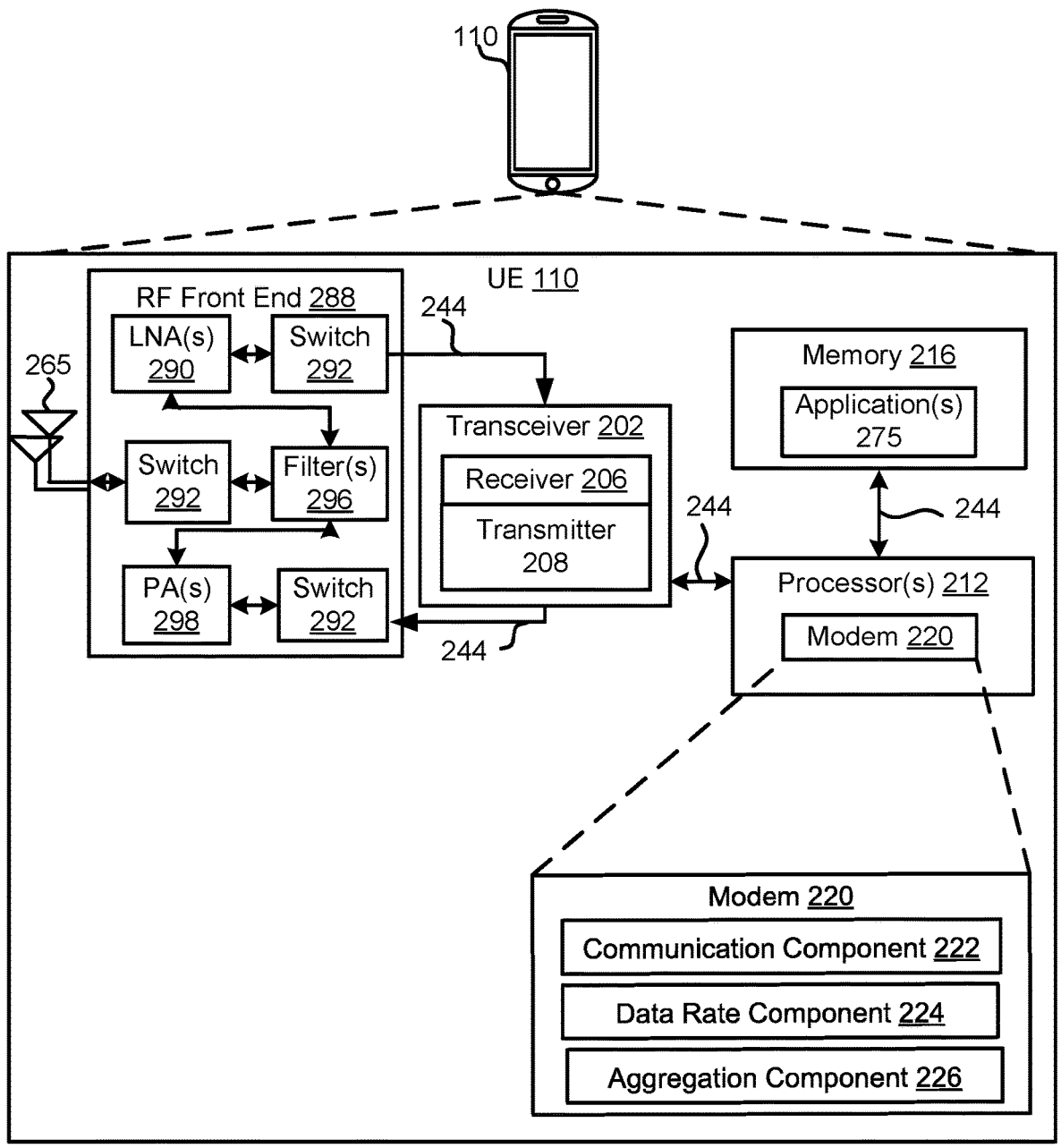
FIG. 2 is a schematic diagram of an example of a user equipment.

Referring to FIG. 2, one example of an implementation of the UE 110 may include a modem 220 having a communication component 222, a data rate component 224, and an aggregation component 226. The communication component 222 and/or the modem 220 of the UE 110 may be configured to communicate with the BS 105 via a cellular network, a Wi-Fi network, or other wireless and wired networks. The data rate component 224 may determine whether the TCP communication between the UE 110 and the BS 105 is in the slow start phase. The data rate component 224 may compare the current data rate to the peak data rate to determine whether the TCP is in the slow start phase. The aggregation component 226 may aggregate one or more TCP ACKs by delaying the transmission of the ACKs, discarding the ACKs, or not generating the ACKs. The modem 220 may receive and transmit data packets. The aggregation component 226 may aggregate one or more TCP segments based on determination from the data rate component 224.

In some implementations, the UE 110 may include a variety of components, some of which have already been described above, but including components such as one or more processors 212 and memory 216 and transceiver 202 in communication via one or more buses 244, which may operate in conjunction with the modem 220, the communication component 222, the data rate component 224, and/or the aggregation component 226 to enable one or more of the functions described herein related to communicating with the BS 105. Further, the one or more processors 212, modem 220, memory 216, transceiver 202, RF front end 288 and one or more antennas 265, may be configured to support voice and/or data calls (simultaneously or non-simultaneously) in one or more radio access technologies. The one or more antennas 265 may include one or more antennas, antenna elements and/or antenna arrays.

In an aspect, the one or more processors 212 may include the modem 220 that uses one or more modem processors. The various functions related to the communication component 222, the data rate component 224, and/or the aggregation component 226 may be included in the modem 220 and/or processors 212 and, in an aspect, may be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiving device processor, or a transceiver processor associated with transceiver 202. Additionally, the modem 220 may configure the UE 110 along with the data rate component 224, and/or the aggregation component 226 and the processors 212. In other aspects, some of the features of the one or more processors 212 and/or the modem 220 associated with the communication component 222 may be performed by transceiver 202.

Also, memory 216 may be configured to store data used herein and/or local versions of applications 275 or the communication component 222 and/or one or more subcomponents of the communication component 222 being executed by at least one processor 212. Memory 216 may include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining the communication component 222 and/or one or more of its subcomponents, and/or data associated therewith, when UE 110 is operating at least one processor 212 to execute the communication component 222, the data rate component 224, and/or the aggregation component 226 and/or one or more of their subcomponents.

Transceiver 202 may include at least one receiving device 206 and at least one transmitter 208. Receiving device 206 may include hardware, firmware, and/or software code executable by a processor for receiving data, the code comprising instructions and being stored in a memory (e.g., computer-readable medium). Receiving device 206 may be, for example, a RF receiving device. In an aspect, receiving device 206 may receive signals transmitted by at least one BS 105. Transmitter 208 may include hardware, firmware, and/or software code executable by a processor for transmitting data, the code comprising instructions and being stored in a memory (e.g., computer-readable medium). A suitable example of transmitter 208 may include, but is not limited to, an RF transmitter.

Moreover, in an aspect, UE 110 may include RF front end 288, which may operate in communication with one or more antennas 265 and transceiver 202 for receiving and transmitting radio transmissions, for example, wireless communications transmitted by at least one BS 105 or wireless transmissions transmitted by UE 110. RF front end 288 may be coupled with one or more antennas 265 and may include one or more low-noise amplifiers (LNAs) 290, one or more switches 292, one or more power amplifiers (PAs) 298, and one or more filters 296 for transmitting and receiving RF signals.

In an aspect, LNA 290 may amplify a received signal at a desired output level. In an aspect, each LNA 290 may have a specified minimum and maximum gain values. In an aspect, RF front end 288 may use one or more switches 292 to select a particular LNA 290 and the specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and the specified gain value based on a desired gain value for a particular application.

Also, for example, one or more filters 296 may be used by RF front end 288 to filter a received signal to obtain an input RF signal. Similarly, in an aspect, for example, a respective filter 296 may be used to filter an output from a respective PA 298 to produce an output signal for transmission. In an aspect, each filter 296 may be coupled with a specific LNA 290 and/or PA 298. In an aspect, RF front end 288 may use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 110 may communicate with, for example, one or more BS 105 or one or more cells associated with one or more BS 105. In an aspect, for example, the modem 220 may configure transceiver 202 to operate at a specified frequency and power level based on the UE configuration of the UE 110 and the communication protocol used by the modem 220.

In an aspect, the modem 220 may be a multiband-multimode modem, which may process digital data and communicate with transceiver 202 such that the digital data is sent and received using transceiver 202. In an aspect, the modem 220 may be multiband and be configured to support multiple frequency bands for a specific communications protocol. In an aspect, the modem 220 may be multimode and be configured to support multiple operating networks and communications protocols. In an aspect, the modem 220 may control one or more components of UE 110 (e.g., RF front end 288, transceiver 202) to enable transmission and/or reception of signals from the network based on a specified modem configuration. In an aspect, the modem configuration may be based on the mode of the modem and the frequency band in use. In another aspect, the modem configuration may be based on UE configuration information associated with UE 110 as provided by the network.

Figure 3:
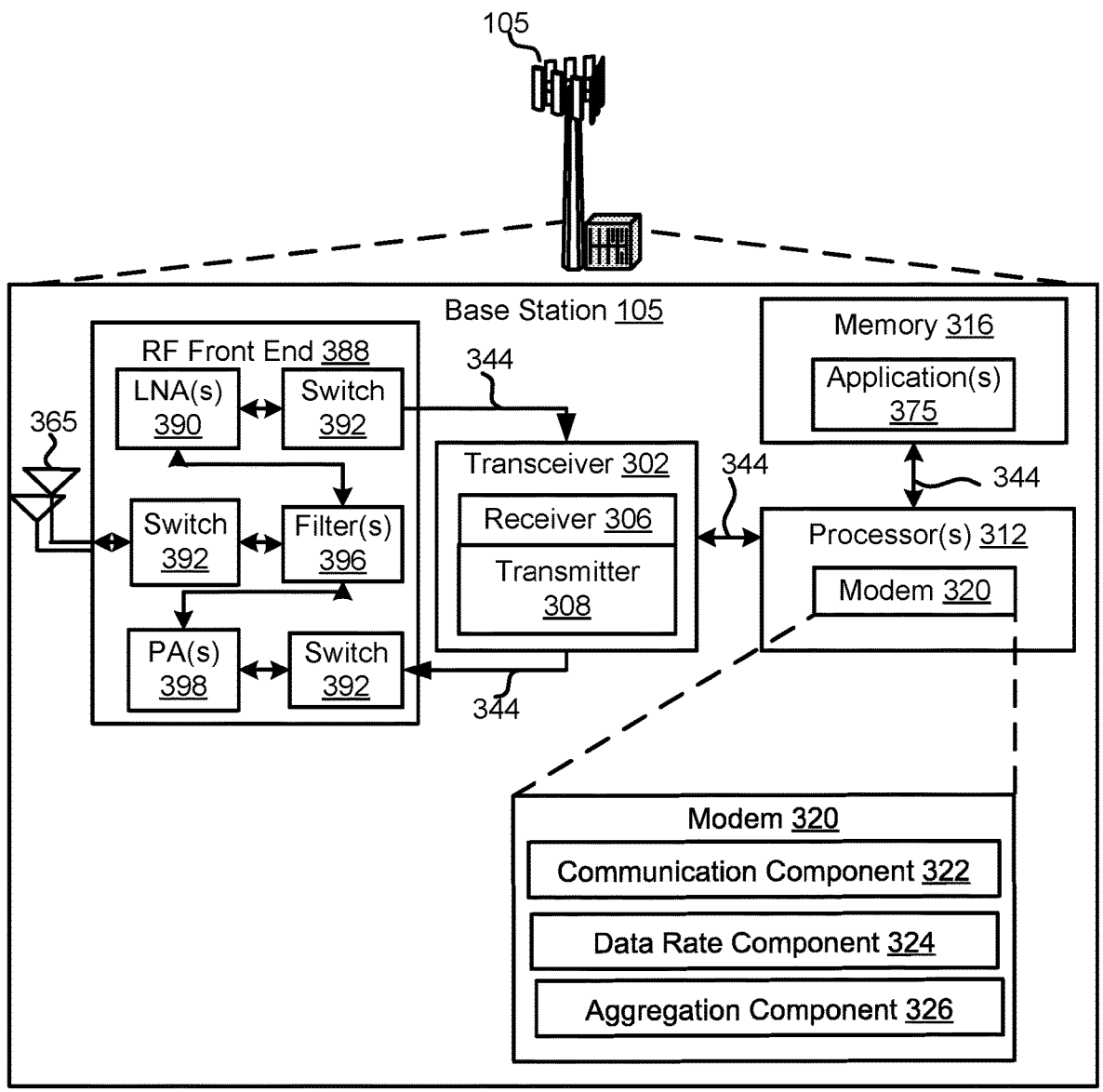
FIG. 3 is a schematic diagram of an example of a base station.

Referring to FIG. 3, one example of an implementation of the BS 105 may include a modem 320 with a communication component 322, a data rate component 324, and an aggregation component 326. The communication component 322 and/or the modem 320 of the BS 105 may be configured to communicate with the UE 110 via a cellular network, a Wi-Fi network, or other wireless and wired networks. The data rate component 324 may determine whether the TCP communication between the BS 105 and another BS 105 or UE 110 is in the slow start phase. The data rate component 324 may compare the current data rate to the peak data rate to determine whether the TCP is in the slow start phase. The aggregation component 326 may aggregate one or more TCP ACKs by delaying the transmission of the ACKs, discarding the ACKs, or not generating the ACKs. The modem 320 may receive and transmit data packets.

In some implementations, the BS 105 may include a variety of components, some of which have already been described above, but including components such as one or more processors 312 and memory 316 and transceiver 302 in communication via one or more buses 344, which may operate in conjunction with the modem 320 and the communication component 322, the data rate component 324, and/or the aggregation component 326 to enable one or more of the functions described herein related to communicating with the UE 110. Further, the one or more processors 312, modem 320, memory 316, transceiver 302, RF front end 388 and one or more antennas 365, may be configured to support voice and/or data calls (simultaneously or non-simultaneously) in one or more radio access technologies.

In an aspect, the one or more processors 312 may include the modem 320 that uses one or more modem processors. The various functions related to the communication component 322, the data rate component 324, and/or the aggregation component 326 may be included in the modem 320 and/or processors 312 and, in an aspect, may be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiving device processor, or a transceiver processor associated with transceiver 302. Additionally, the modem 320 may configure the BS 105 and processors 312. In other aspects, some of the features of the one or more processors 312 and/or the modem 320 associated with the communication component 322 may be performed by transceiver 302.

Also, memory 316 may be configured to store data used herein and/or local versions of applications 375 or the communication component 322 and/or one or more subcomponents of the communication component 322 being executed by at least one processor 312. Memory 316 may include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining the communication component 322 and/or one or more of its subcomponents, and/or data associated therewith, when the BS 105 is operating at least one processor 312 to execute the communication component 322 and/or one or more of the subcomponents.

Transceiver 302 may include at least one receiving device 306 and at least one transmitter 308. The at least one receiving device 306 may include hardware, firmware, and/or software code executable by a processor for receiving data, the code comprising instructions and being stored in a memory (e.g., computer-readable medium). Receiving device 306 may be, for example, a RF receiving device. In an aspect, receiving device 306 may receive signals transmitted by the UE 110. Transmitter 308 may include hardware, firmware, and/or software code executable by a processor for transmitting data, the code comprising instructions and being stored in a memory (e.g., computer-readable medium). A suitable example of transmitter 308 may include, but is not limited to, an RF transmitter.

Moreover, in an aspect, the BS 105 may include RF front end 388, which may operate in communication with one or more antennas 365 and transceiver 302 for receiving and transmitting radio transmissions, for example, wireless communications transmitted by other BS 105 or wireless transmissions transmitted by UE 110. RF front end 388 may be coupled with one or more antennas 365 and may include one or more low-noise amplifiers (LNAs) 390, one or more switches 392, one or more power amplifiers (PAs) 398, and one or more filters 396 for transmitting and receiving RF signals.

In an aspect, LNA 390 may amplify a received signal at a desired output level. In an aspect, each LNA 390 may have a specified minimum and maximum gain values. In an aspect, RF front end 388 may use one or more switches 392 to select a particular LNA 390 and the specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and the specified gain value based on a desired gain value for a particular application.

Also, for example, one or more filters 396 may be used by RF front end 388 to filter a received signal to obtain an input RF signal. Similarly, in an aspect, for example, a respective filter 396 may be used to filter an output from a respective PA 398 to produce an output signal for transmission. In an aspect, each filter 396 may be coupled with a specific LNA 390 and/or PA 398. In an aspect, RF front end 388 may use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that BS 105 may communicate with, for example, the UE 110 or one or more cells associated with one or more BS 105. In an aspect, for example, the modem 320 may configure transceiver 302 to operate at a specified frequency and power level based on the base station configuration of the BS 105 and the communication protocol used by the modem 320.

In an aspect, the modem 320 may be a multiband-multimode modem, which may process digital data and communicate with transceiver 302 such that the digital data is sent and received using transceiver 302. In an aspect, the modem 320 may be multiband and be configured to support multiple frequency bands for a specific communications protocol. In an aspect, the modem 320 may be multimode and be configured to support multiple operating networks and communications protocols. In an aspect, the modem 320 may control one or more components of the BS 105 (e.g., RF front end 388, transceiver 302) to enable transmission and/or reception of signals from the network based on a specified modem configuration. In an aspect, the modem configuration may be based on the mode of the modem and the frequency band in use. In another aspect, the modem configuration may be based on base station configuration associated with the BS 105.

Figure 4:
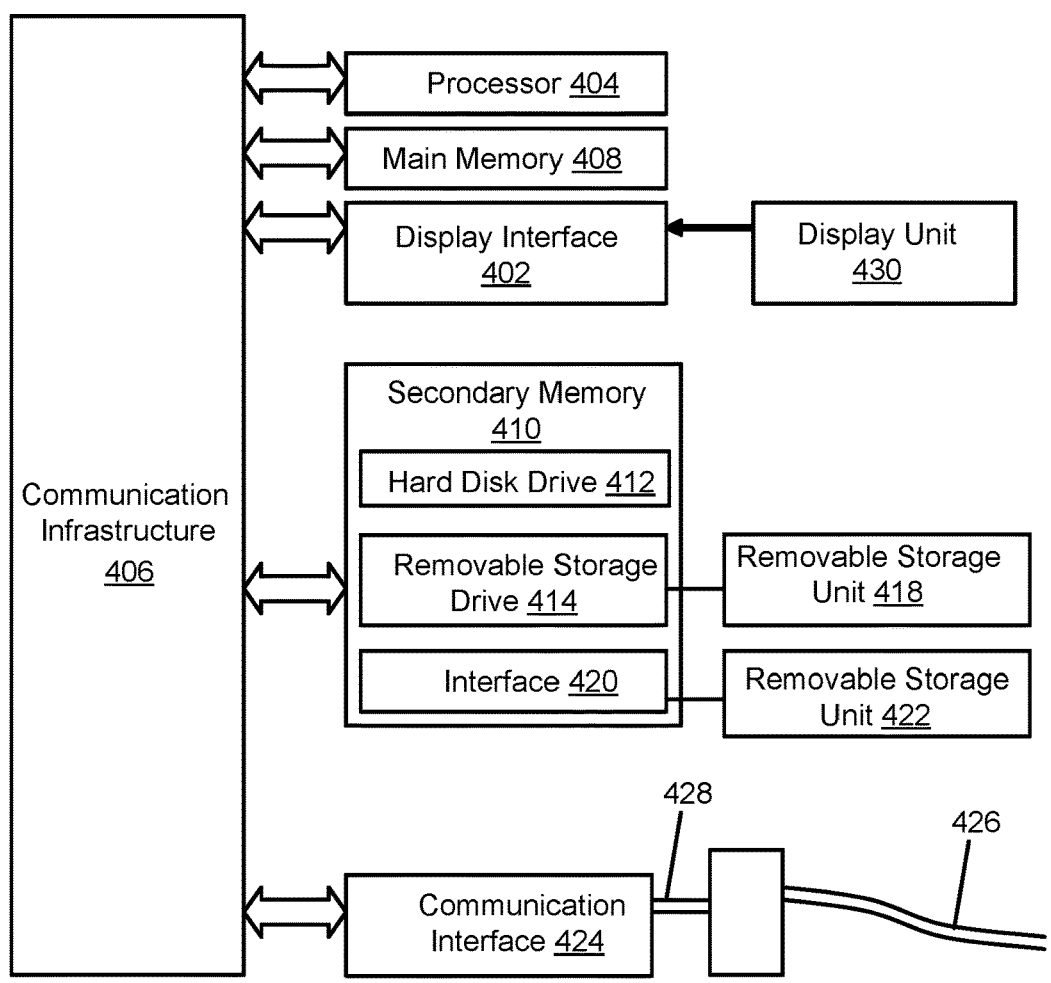
FIG. 4 is a schematic diagram of an example of a computer system for implementing a core network.

Referring now to FIG. 4, the core network 160 or 190 may be implemented as one or more core network devices, such as an example of a computer system 400. The computer system 400 may be a hardware system, a virtual system, a cloud-based system, or a combination thereof. The computer system 400 includes one or more processors, such as the processor 404. The processor 404 is communicatively coupled with a communication infrastructure 406 (e.g., a communications bus, cross-over bar, or network).

The computer system 400 may include a display interface 402 that forwards graphics, text, and other data from the communication infrastructure 406 (or from a frame buffer not shown) for display on a display unit 430. Computer system 400 also includes a main memory 408, preferably random access memory (RAM), and may also include a secondary memory 410. The secondary memory 410 may include, for example, a hard disk drive 412, and/or a removable storage drive 414, representing a floppy disk drive, magnetic tape drive, optical disk drive, universal serial bus (USB) flash drive, etc. The removable storage drive 414 reads from and/or writes to a first removable storage unit 418 in a well-known manner. The first removable storage unit 418 represents a floppy disk, magnetic tape, optical disk, USB flash drive etc., which is read by and written to removable storage drive 414. As will be appreciated, the first removable storage unit 418 includes a computer usable storage medium having stored therein computer software and/or data.

Alternative aspects of the present disclosure may include secondary memory 410 and may include other similar devices for allowing computer programs or other instructions to be loaded into computer system 400. Such devices may include, for example, a second removable storage unit 422 and an interface 420. Examples of such may include a program cartridge and cartridge interface (such as that found in video game devices), a removable memory chip (such as an erasable programmable read only memory (EPROM), or programmable read only memory (PROM)) and associated socket, and other removable storage units (not shown) and interfaces 420, which allow software and data to be transferred from the second removable storage unit 422 to computer system 400.

Computer system 400 may also include a communications interface 424. Communications interface 424 allows software and data to be transferred between computer system 400 and external devices. Examples of communications interface 424 may include a modem, a network interface (such as an Ethernet card), a communications port, a Personal Computer Memory Card International Association (PCMCIA) slot and card, etc. Software and data transferred via communications interface 424 are in the form of signals 428, which may be electronic, electromagnetic, optical or other signals capable of being received by communications interface 424. These signals 428 are provided to communications interface 424 via a communications path (e.g., channel) 426. This path 426 carries signals 428 and may be implemented using one or more of a wire or cable, fiber optics, telephone line, cellular link, RF link and/or other communications channels. In this document, the terms "computer program medium" and "computer usable medium" are used to refer generally to media such as the first removable storage unit 418, a hard disk installed in hard disk drive 412, and signals 428. These computer program products provide software to the computer system 400. Aspects of the present disclosure are directed to such computer program products.

Computer programs (also referred to as computer control logic) are stored in main memory 408 and/or secondary memory 410. Computer programs may also be received via communications interface 424. Such computer programs, when executed, enable the computer system 400 to perform the features in accordance with aspects of the present disclosure, as discussed herein. In particular, the computer programs, when executed, enable the processor 404 to perform the features in accordance with aspects of the present disclosure. Accordingly, such computer programs represent controllers of the computer system 400.

In an aspect of the present disclosure where the method is implemented using software, the software may be stored in a computer program product and loaded into computer system 400 using removable storage drive 414, hard drive 412, or communications interface 420. The control logic (software), when executed by the processor 404, causes the processor 404 to perform the functions described herein. In another aspect of the present disclosure, the system is implemented primarily in hardware using, for example, hardware components, such as application specific integrated circuits (ASICs). Implementation of the hardware state machine so as to perform the functions described herein will be apparent to persons skilled in the relevant art(s).

Figure 5:
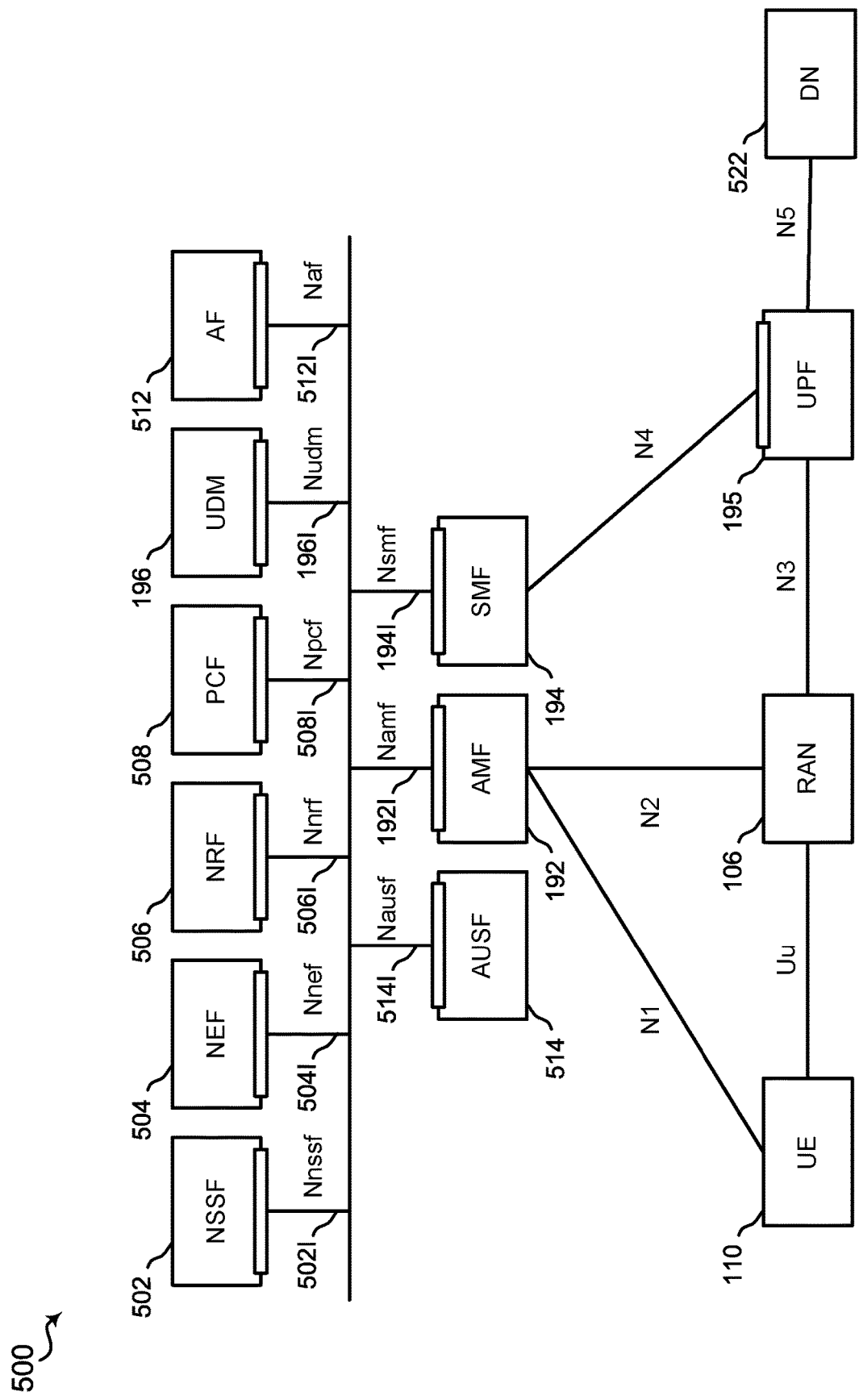
FIG. 5 is an example of a functional diagram illustrating the service-based architecture (SBA)

Turning now to FIG. 5, a service based architecture (SBA) 500 of the wireless communication network 100 may include a number of interconnected network functions (NFs). The SBA 500 may include a network slice selection function (NSSF) 502 that may support the selection of the network slice instances to serve the one or more UEs 110, and determines the allowed network slice selection assistance information and the access and mobility management function (AMF) set to be used to serve the one or more UEs 110. The NSSF 502 may communicate with other functions within the SBA 500 via a Nnssf 502I interface. The SBA 500 may include a network exposure function (NEF) 504 that may support exposure of capabilities and events, secure provision of information from external application to various wireless communication networks, and translation of internal and external information. The NEF 504 may communicate with other functions within the SBA 500 via a Nnef 504I interface.

Still referring to FIG. 5, the SBA 500 may include a network repository function (NRF) 506 that may support service discovery functions and may maintain NF profiles and available NF instances. The NRF 506 may communicate with other functions within the SBA 500 via a Nnrf 506I interface. The SBA 500 may include a policy control function (PCF) 508 that may support unified policy framework, provide policy rules to control plane (CP) functions, access subscription information for policy decisions in unified data repository (UDP). The PCF 508 may communicate with other functions within the SBA 500 via a Npcf 508I interface.

Still referring to FIG. 5, the SBA 500 may include the UDM 196 that may support the generations of authentication and key agreement (AKA) credentials, user identification handling, access authorization, and subscription management. The UDM 196 may communicate with other functions within the SBA 500 via a Nudm 196I interface. The SBA 500 may include an application function (AF) 512 that may support application influence on traffic routing and interaction with policy framework for policy control. The AF 512 may communicate with other functions within the SBA 500 via a Naf 512I interface.

Still referring to FIG. 5, the SBA 500 may include an authentication server function (AUSF) 514 that may serve as an authentication server. The AUSF 514 may communicate with other functions within the SBA 500 via a Nausf 514I interface. The SBA 500 may include the AMF 192 that may support the termination of non-access-stratum (NAS) signaling, NAS ciphering and integrity protection, registration management, connection management, mobility management, access authentication and authorization, security context management. The AMF 192 may communicate with other functions within the SBA 500 via a Namf 192I interface. The AMF 192 may also communicate with the UE 110 via the N1 interface and a RAN 106 with the N2 interface.

The RAN 106 may be a network entity residing between the core network 160 or 190 and the UE 110. The RAN 106 may be implemented, for example, by the BS 105. The RAN 106 may relay data between the core network 160 or 190 and the UE 110.

Still referring to FIG. 5, the SBA 500 may include the SMF 194 that may support session management (session establishment, modification, release), UE internet protocol (IP) address allocation & management, dynamic host configuration protocol functions, termination of NAS signaling related to session management, downlink data notification, traffic steering configuration for UPF for proper traffic routing. The SMF 194 may communicate with other functions within the SBA 500 via a Nsmf 194I interface. The SBA 500 may include the UPF 195 that may support packet routing & forwarding, packet inspection, quality of service (QoS) handling, act as the external PDU session interface to the data network (DN) 522, and is an anchor point for both intra radio access technology (RAT) and inter-RAT mobility. The UPF 195 may communicate with the SMF 194 via a N4 interface, the DN 522 via the N5 interface, and the RAN 106 via the N3 interface.

In some implementations, the RAN 106 and the UE 110 may communicate via the Uu (wireless radio or "air") interface.

Figure 6:
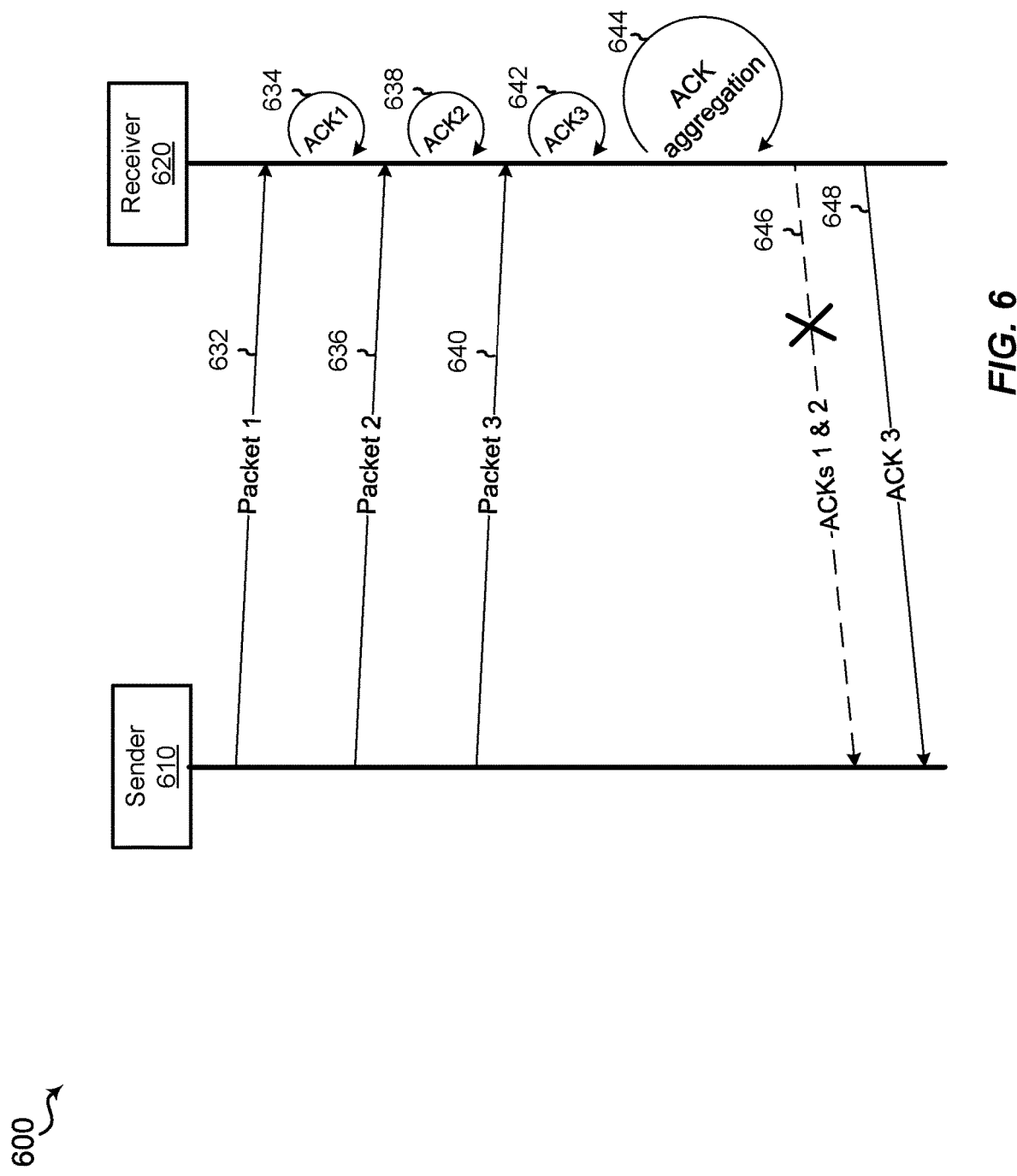
FIG. 6 is an example of ACK aggregation for TCP data communication between two devices.

Turning now to FIG. 6, a diagram 600 illustrates an example of reducing ACKs for TCP data communication between two devices. Although TCP aggregation is used in the current example, other transport protocols (TPs) such as Quick User Datagram Protocol Internet Connections (QUIC) protocol may also implement aspects of the present disclosure. For example, the QUIC protocol may send one ACK for every two packets received. A receiving device implementing the QUIC protocol may perform ACK aggregation when not in a low throughput phase and suspend ACK aggregation when in the low throughput phase.

As illustrated in the diagram 600, in some implementations, a sending device 610, such as the UE 110 or the BS 105, may send one or more packets to a receiving device 620, such as a different UE 110 or BS 105. In some implementations, the sending device 610 may send (632) packet 1 to the receiving device 620. In response to receiving packet 1, the receiving device 620 may generate (634) ACK 1. The sending device 610 may send (636) packet 2 to the receiving device 620. In response to receiving packet 2, the receiving device 620 may generate (638) ACK 2. In certain examples, an ACK may not be generated for every received packet. For example, ACK 2 may be generated, whereas ACK 1 may not be generated. This may be possible because TCP ACKs may be cumulative. The ACKs may cumulatively acknowledge reception of all packets up to the indicated sequence number. Next, the sending device 610 may send (640) packet 3 to the receiving device 620. In response to receiving packet 3, the receiving device 620 may generate (642) ACK 3. After generating ACKs 1-3, the receiving device 620 may aggregate (644) some of the ACKs. In one non-limiting example, only ACK 3 is transmitted (648) to the sending device 610 to acknowledge the reception of packets 1-3, while ACKs 1 and 2 are not transmitted (646) to the sending device 610. ACKs 1 and 2 may be discarded without being sent to the sending device 610. In certain aspects, ACK 3 and at least one of ACK 1 and 2 may be unique ACKs.

Therefore, instead of sending three ACKs (i.e., ACKs 1, 2, and 3) regarding the three received packets (i.e., packets 1, 2, and 3) to the sending device 610 separately, the receiving device 620 may send only one ACK to the sending device 610 to acknowledge the reception of all three packets. This may reduce the cost for processing TCP acknowledgments in the modem of the receiving device 620, while maintaining the reliability of the TCP traffic. Further, this may reduce the data transmitted over the network.

Figure 7:
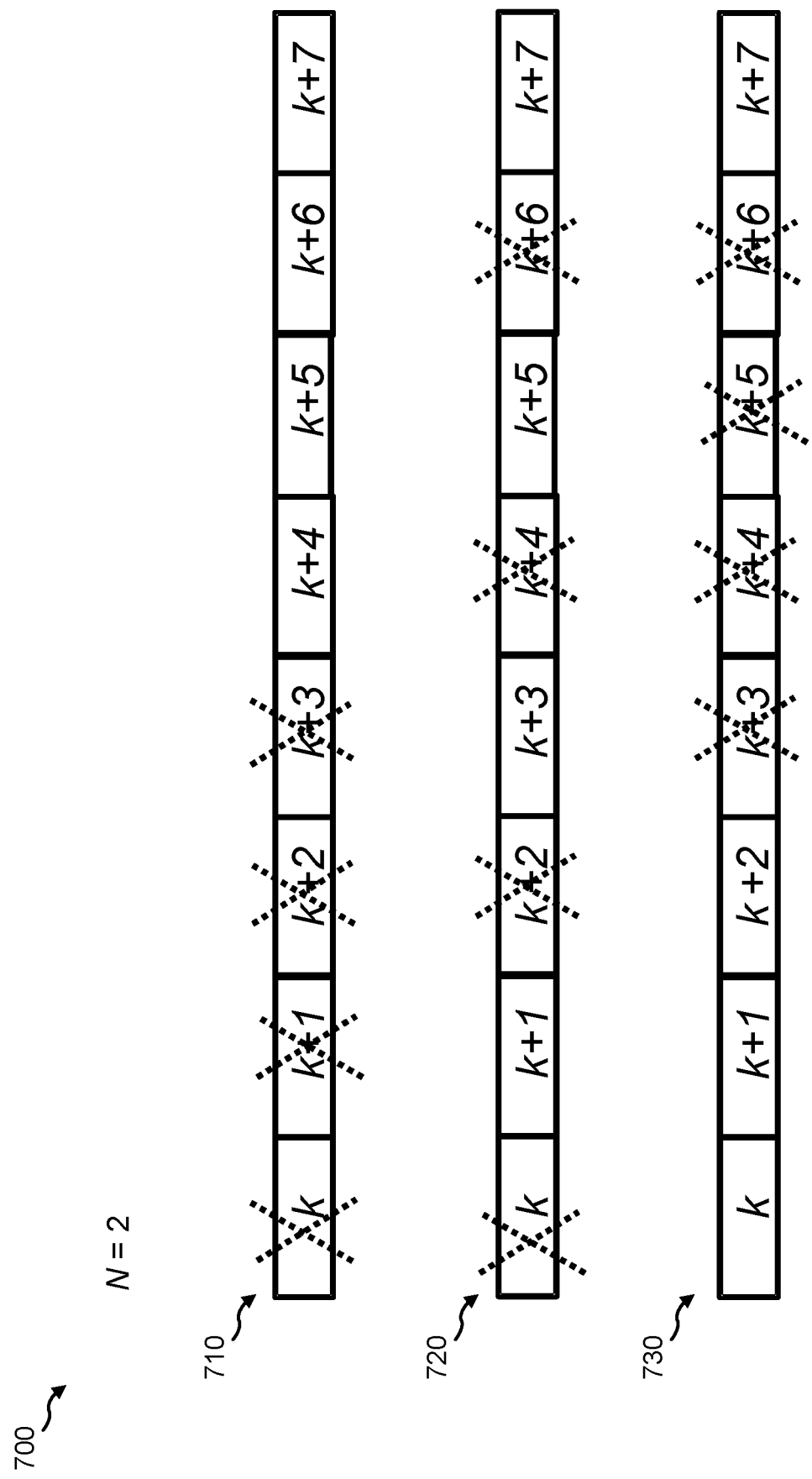
FIG. 7 is a diagram illustrating several examples of TCP ACK aggregation implementation.

Turning now to FIG. 7, a diagram 700 illustrates several examples of TCP ACK aggregation. Specifically, the diagram 700 shows three implementations 710, 720, and 730 of TCP ACK aggregation when the reduction factor N equals to 2. A reduction factor may be associated with a decrease in ACK transmitted when utilizing ACK aggregation. For example, if a receiving device sends 2000 ACKs for 2000 packets, a reduction factor of 4 would mean that the receiving device only sends 500 ACKs when utilizing ACK aggregation. For each implementation, there may be eight unique TCP ACKs (ACK k, ACK k+1 . . . ACK k+7) generated in response to the received TCP traffic within a fixed interval. Because the reduction factor N is 2, four unique TCP ACKs may be transmitted to the sending device to acknowledge the reception of the TCP traffic within the interval, and the other four unique TCP acknowledgments may be discarded.

In the first implementation 710, the unique TCP ACKs with the highest sequence number(s) in the interval may be transmitted to the sending device, and the unique TCP ACKs with the lowest sequence number(s) may be discarded. The unique TCP ACKs with the highest sequence number(s) may be the unique TCP ACKs that are generated to acknowledge the latest transmitted packets. As shown in the first implementation 710, ACK k, ACK k+1, ACK k+2, and ACK k+3 may be discarded, while ACK k+4, ACK k+5, ACK k+6, and ACK k+7 may be transmitted to the sending device.

In the second implementation 720, to achieve reduction factor N, only one unique TCP ACK (e.g., the one with the highest sequence number) in every N unique TCP ACKs may be transmitted to the sending device, and the other unique TCP ACKs may be discarded. As shown in the second implementation 720, ACK k, ACK k+2, ACK k+4, and ACK k+6 may be discarded, while ACK k+1, ACK k+3, ACK k+5, and ACK k+7 may be transmitted to the sending device.

In the third implementation 730, the earliest unique TCP ACKs (e.g., the ones with the lowest sequence numbers) in the interval and the last unique TCP ACKs (e.g., the one with the highest sequence number) in the interval may be transmitted to the sending device, and the other unique TCP ACKs may be discarded. As shown in the third implementation 730, ACK k+3, ACK k+4, ACK k+5, and ACK k+6 may be discarded, while ACK k, ACK k+1, ACK k+2, and ACK k+7 may be transmitted to the sending device.

Figure 8:
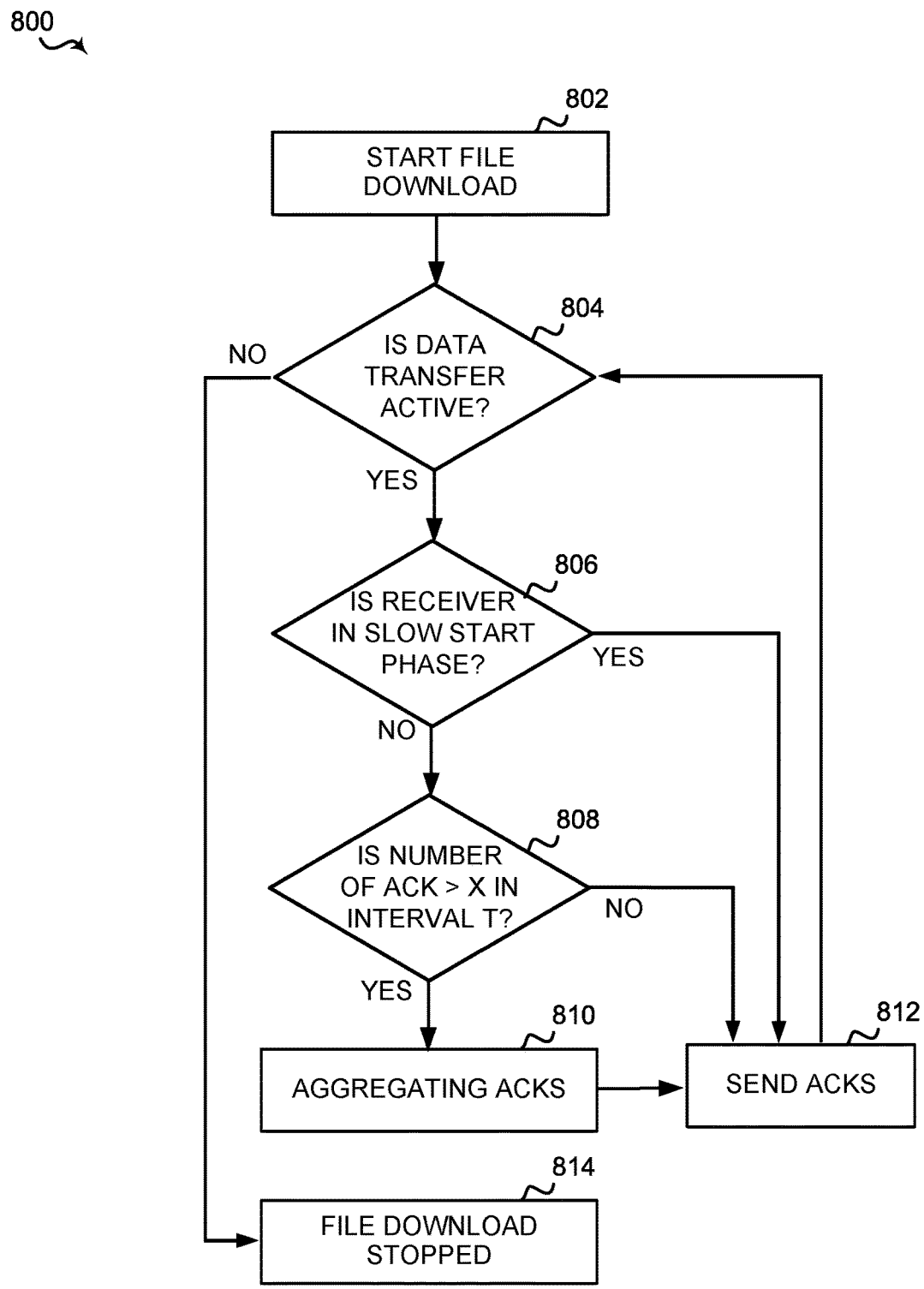
FIG. 8 is a process flow diagram of an example of TCP ACK aggregation during the low throughput phase.

Turning now to FIG. 8, the UE 110 may perform an example of a method 800 for performing the TCP ACK aggregation according to certain aspects of the present disclosure. The method 800 may be performed by a receiving device, such as the UE 110 or the BS 105, of one or more TCP packets.

At block 802, the method 800 may begin a data transfer process, such as the file download process. An application of the receiving device, such as the applications 275, the memory 216, the modem 220, the communication component 222, the data rate component 224, the aggregation component 226, and/or the processor 212 of the UE 110, may download a file transmitted by a sending device, such as another UE 110, server or BS 105.

At block 804, in some aspects, the receiving device (e.g., via the modem 220, the communication component 222, the data rate component 224, and/or the processor 212) may determine whether the file download process is still active. If the file download process is no longer active, the receiving device may determine that the file download process has terminated (814). If the file download process is active, the receiving device may move on to block 806.

At block 806, in some implementations, the receiving device may determine (e.g., via the modem 220, the communication component 222, the data rate component 224, and/or the processor 212) whether the data transfer is in a slow start phase. Slow start may be a congestion control strategy used by TCP or other transport protocol such as QUIC to avoid sending more data than the network is capable of forwarding. Slow start may begin initially with a congestion window size (CWND) of, for example, 1, 2, 4 or 10 MSS. The value for the CWND may be increased by one with each acknowledgement (ACK) received, therefore, doubling the window size for each round-trip time. The transmission rate may be increased until either a loss is detected, or the receiving device's advertised window (RWND) becomes the limiting factor, or slow start threshold (ssthresh) is reached, for example. In such setup, if one or more Acks are not received, such as due to aggregation, the CWND may not grow as fast, leading to reduced throughput.

In certain aspects, the receiving device may detect slow start after the congestion avoidance phase by tracking the current data rate of the TCP connection. In some implementation the TCP data rate may be computed by observing the number of ACKs (Δ(ACK_SN), the difference in the sequence number of one ACK and the sequence number of another ACK) divided by a given time period (Δ(time)) on the non-data direction:

$$\text{Current Data Rate} = \frac{\Delta(\text{ACK\_SN})}{\Delta(\text{time})}.$$

For example, the UE 110 may track the sequence numbers of the ACKs within a given time period. At time $t_1$=1.1 millisecond, the sequence number for the ACK may be 1050, and at time $t_2$=1.4 millisecond, the sequence number for the ACK may be 2500. Therefore the current data rate may be calculated as (2500−1050)/(1.4−1.1), which approximately equals to 4,833 ACKs per millisecond.

The receiving device may keep track of the peak data rate over some time interval during the congestion avoidance phase. When the current data rate is lower than the peak data rate divided by a predetermined constant α

$$\left(i.e., \text{Current Data Rate} < \frac{\text{Peak Data Rate}}{\alpha}\right),$$

the receiving device may infer that the data transfer is in a slow start phase and disable the TCP ACK aggregation process for the download connection until the current data rate reaches a defined level. The level may be the steady state based on the round-trip time (RTT), link capacity (C), and MSS, or a previous high rate observed for this connection.

In other implementations, the receiving device may estimate the duration of the slow start phase. For example, after the beginning of the slow start phase, the receiving device may compute the time, D, until the end of the slow start phase, based on the equation D=R×RTT, where R is the number of round-trips since the beginning of the slow start phase. The equation above may be used to compute the end of a low throughput phase from the beginning of the low throughput phase. Further, the receiving device may calculate the CWND using the equation CWND=C×RTT, where, as discussed above, C is the link capacity and RTT is the round-trip time between the sending device and the receiving device.

In some instances, the CWND may be calculated using the equation CWND=MSS×Start_win×$2^R$. The initial CWND size, Start_win, may be 1 packet, 2 packets, 5 packets, 10 packets, 20 packets, 50 packets, 100 packets, or other number of packets. The TCP packet size (i.e., MSS) may be 500 bytes, 1000 bytes, 1450 bytes, 2000 bytes, 5000 bytes, 10000 bytes, or other number of bytes. R is the number of round-trips, as discussed above. Using the equation, the CWND doubles in size for each RTT. R may be rewritten as $$R = \log_2\left(\frac{RTT \times C}{MSS \times \text{Start\_win}}\right).$$

In one alternative implementations, the UE 110 may determine an end of a low throughput phase based on the number of ACKs. If the number of ACKs exceeds a predetermined threshold, then the UE 110 may determine the end of a low throughput phase.

At block 812, in certain implementations, if the receiving device is in the slow start phase, the receiving device may bypass (e.g., the modem 220, the communication component 222 and/or the processor 212) the ACK aggregation process and transmit one or more ACKs to the sending device. The one or more ACKs may be ACKs stored in the buffer from previous transmissions of TCP packets, or the ACKs in response to the most recent transmissions of TCP packets. During the slow start phase, ACK aggregation may cause delays during the transmissions of small files, such as files that are 0.5 megabytes (MB), 2 MB, 5 MB, 10 MB, 20 MB, 50 MB, and/or 100 MB.

At block 808, in certain optional examples, if the receiving device is not in the slow start phase, the receiving device may determine (e.g., via the modem 220, the data rate component 224 and/or the processor 212) whether the number of ACKs is greater than X in an interval T. For example, the value X may be 1, 2, 3, 5, 10, 20, 30. The interval T may be 100 microseconds (μs), 200 μs, 500 μs, 1 millisecond (ms), 2 ms, 5 ms, 10 ms, 20 ms, 50 ms or 100 ms. Other values of X and/or T may also be implemented according to different aspects of the present disclosure. In one instance, the test at block 808 may be performed when the receiving device is not in the slow start phase, but transmits at a rate lower than a predetermined threshold (e.g., a low throughput phase). As a result, it may be desirable to postpone ACK aggregation (to send more ACKs to the sending device to induce higher transmission).

At block 810, in some implementations, if the receiving device determines that the number of ACKs is greater than X in the interval T, the receiving device may begin or continue to aggregate ACSs. For example, the receiving device may not send (e.g., discarding) ACKs for certain TCP packets received and send other ACKs for other TCP packets, as described above.

At block 812, in certain aspects, if the receiving device determines that the number of ACKs is less than or equal to X in the interval T, or the data transfer is in slow start phase, the receiving device may not aggregate ACKs and may transmit (e.g., via the modem 220, the communication component 222, and/or the processor 212) one or more ACKs to the sending device.

Figure 9:
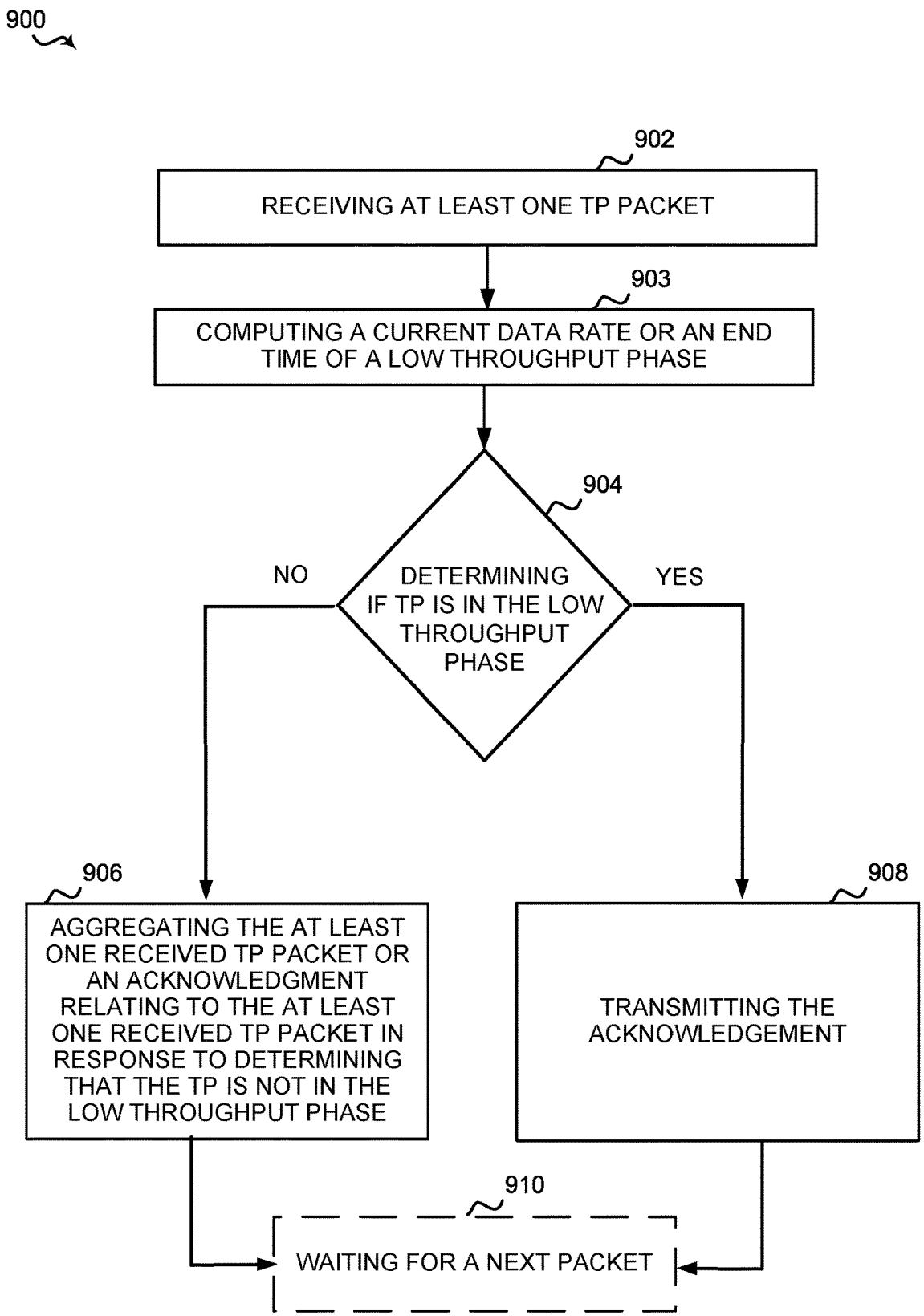
FIG. 9 is a process flow diagram of another example of TCP ACK aggregation during the low throughput phase.

Referring to FIG. 9, an example of a method 900 for TCP ACK aggregation may be performed by a receiving device, such as the UE 110 or the BS 105 in the wireless communication network 100. While the current example illustrates TCP ACK aggregation, other TP may also implement the ACK aggregation according to aspect of the present disclosure.

At block 902, the method 900 may receive at least one TP packet. For example, the communication component 222, the modem 220, and/or the processor 212 of the UE 110 may receive a TCP packet from a sending device, such as another UE 110 or BS 105. The one or more antennas 265 may receive electro-magnetic signals from one or more antennas 265 of the relay UE 110. The RF front end 288 may filter, amplify, and/or extract electrical signals carried by the electro-magnetic signals. The transceiver 202 or the receiving device 206 may digitize and convert the electrical signal into the data, such as the TCP packet, and send to the communication component 222. In other implementations, the communication component 322, the modem 320, and/or the processor 312 of the BS 105 may receive the TCP packet from the sending device. In other examples, the communication component 322, the modem 320, and/or the processor 312 of the BS 105 may receive at least one QUIC packet from the sending device.

At block 903, the method 900 may compute a current data rate or an end time of a low throughput phase (as discussed above). For example, the data rate component 224, the modem 220, and/or the processor 212 of the UE 110 may compute the current data rate by dividing the difference in the sequence number of a first ACK at a first time and the sequence number of a second ACK at a second time divided by the difference between the first time and the second time. Other methods of computing the data rate may include computing a moving average of N instantaneous data rate, receiving a data rate computed by the sending device, computing an instantaneous data rate, etc. For example, the data rate component 224, the modem 220, and/or the processor 212 of the UE 110 may compute the end time of the low throughput phase by computing a product of a round-trip time between the receiving device and the sending device and a number of round-trips.

At block 904, the method 900 may determine if TP is in the low throughput phase. For example, the data rate component 224, the modem 220, and/or the processor 212 of the UE 110 may determine if the TP (e.g., data transfer via the TP between the sending device and the receiving device) is in a slow start phase. The TP may be in the slow start phase when the current data rate is lower than the peak data rate divided by a predetermined factor or constant α. Alternatively, the receiving device may compute the duration of the slow start phase using the equation D=R×RTT. In other implementations, the data rate component 324, the modem 320, and/or the processor 312 of the BS 105 may determine if the receiving device (e.g., BS 105) is in a slow start phase.

At block 906, the method 900 may aggregate the at least one received TP packet or an ACK relating to the at least one received TP packet in response to determining that the TP is not in the low throughput phase. For example, the aggregation component 226, the modem 220, and/or the processor 212 may generate an ACK in response to the TCP packet received, and store the generated ACK in a buffer, such as the memory 216. The receiving device may aggregate the ACK, and wait until another TCP packet has arrived to generate a second ACK to be sent to the sending device. The receiving device may utilize an aggregation implementation, such as one described in FIGS. 6 and 7. Other transport protocols, such as QUIC, may also perform the ACK aggregation.

In alternative implementations, a protocol on the receiver side may aggregate several received TCP segments into an aggregated TCP segment based on techniques such as Generic Receive Offload (GRO) or Large Receive Offload (LRO). The receiving device may detect that the protocol is in slow start, and avoid or modify the GRO/LRO to reduce the amount of packet aggregation. LRO may be a technique to aggregate multiple incoming packets from a single stream into a larger buffer before the packets are passed higher up the networking stack, thus reducing the number of packets that have to be processed.

In one non-limiting implementation, the protocol on the receiver side may aggregate more than one packet (e.g., TCP, IP, etc.) into a single packet. As a result, fewer packets may reach the TCP stack, which results in lower number of ACKs being sent to the transmitter. The receiver may suspend the aggregation of the TCP and/or IP packet during the low throughput phase (e.g., the slow start phase) to increase the number of ACKs transmitted to the transmitter. Methods described above may be used to determine an end to the low throughput phase. Alternatively, the receiver may resume the aggregation of the packets when the throughput rate reaches a predetermined threshold rate. In other examples, the receiver may compute a moving average of the throughput rate. If the moving average exceeds the predetermined threshold rate, the receiver may determine that the low throughput phase has ended. In another implementation, the receiver may resume the aggregation of the packets when the throughput does not reach the predetermined threshold rate, but a "stable" throughput rate lower than the predetermined threshold rate (e.g., a throughput rate with less than x % fluctuation over y seconds). For example, the receiver may resume the aggregation of the packets when the throughput rate reaches 80% of the predetermined threshold rate, with less than 1% fluctuation in the throughput rate, for 1 second. In one non-limiting example, the receiver may resume the aggregation of the packets when the throughput rate is within p % of the moving average of the last n sampled throughput rates (e.g., if p=3% and the moving average of the last 10 sampled throughput rates is 100, the receiver may consider the throughput rate is "stable" if the sampled rates fluctuate within 97 and 103).

In other implementations, the receiver may control the aggregation during the slow start phase. For example, the receiver may reduce the number of packets being aggregated into a single packet. At a lower throughput rate, the receiver may aggregate less than 2, 5, 10, or 20 packets. As the throughput rate increases, the receiver may aggregate 20, 30, 50, or 100 packets. The receiver may aggregate other numbers of packets in the slow start phase.

At block 908, the method 900 may transmit the ACK. For example the communication component 222, the modem 220, and/or the processor 212 may transmit the ACK via the transceiver 202, the transmitter 208, the RF front end 288, and the one or more antennas 265. The communication component 222, the modem 220, and/or the processor 212 of the UE 110 may transmit the ACK to the transceiver 202 or the transmitter 208. The transceiver 202 or the transmitter 208 may convert the data in the ACK into analog signals. The RF front end 288 may filter, amplify, and package the analog signals sent by the transmitter 202. Next, the RF front end 288 may cause the one or more antennas 265 to emit electro-magnetic signals containing the data in the ACK to the sending device.

In optional implementations, at block 910, after the method 900 aggregates the ACK or transmit the ACK, the receiving device may wait for a next packet. For example, the communication component 222, the modem 220, and/or the processor 212 may wait for the next packet. In one implementation, after aggregating the ACK or transmitting the ACK, the receiving device may wait for the arrival of the next packet. If one or more new packets arrive at the receiving device (not shown), the receiving device may generate and/or transmit one or more ACKs based on the aggregation implementations described in FIGS. 6 and 7. If there is no more incoming packet (not shown), the receiving device may transmit any remaining ACKs stored in the memory 216 back to the sending device, and determine that the file transfer is complete.

In another aspect of the present disclosure, a method of wireless communication by a receiving device may include receiving at least one TP packet, determining if TP is in a slow start phase, and modifying at least one behavior associated with receiving the at least one TP packet. In other aspects, modifying the at least one behavior may include aggregating an acknowledgement (ACK) relating to the at least one received TP packet in response to determining that the TP is not in the slow start phase and transmitting the ACK to a sending device. In another implementation, modifying the at least behavior may include enabling Generic Receive Offload or Large Receive Offload in response to determining that the TP is not in the slow start phase. In some implementations, modifying the at least one behavior may include aggregating a plurality of TP packets into an aggregate TP packet in response to determining that the TP is not in the slow start phase.

Figure 10:
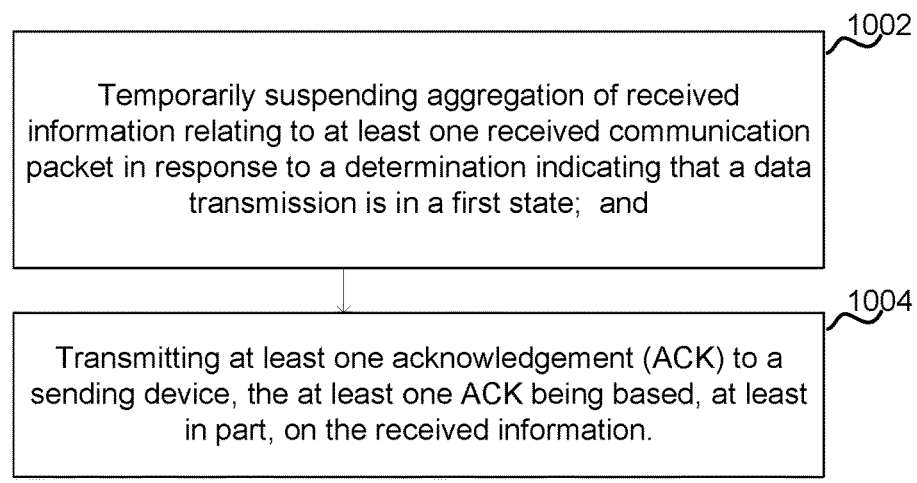
FIG. 10 is a process flow diagram of another example of suspending TCP ACK aggregation during the low throughput phase.

Referring to FIG. 10, in operation, a receiving device, such as a UE 110 or a BS 105, may perform a method 1000 of wireless communication.

At block 1002, the method 1000 includes temporarily suspending aggregation of received information relating to at least one received communication packet in response to a determination indicating that a data transmission is in a first state. For example, in an aspect, the aggregation component 226, the modem 220, and/or the processor 212 may be configured to or may comprise means for temporarily suspending aggregation of received information relating to at least one received communication packet in response to a determination indicating that a data transmission is in a first state.

At block 1004, the method 1000 includes transmitting at least one acknowledgement (ACK) to a sending device, the at least one ACK being based, at least in part, on the received information. For example the communication component 222, the modem 220, and/or the processor 212 may transmit at least one acknowledgement (ACK) to a sending device, the at least one ACK being based, at least in part, on the received information via the transceiver 202, the transmitter 208, the RF front end 288, and the one or more antennas 265. The communication component 222, the modem 220, and/or the processor 212 of the UE 110 may transmit the ACK to the transceiver 202 or the transmitter 208. The transceiver 202 or the transmitter 208 may convert the data in the ACK into analog signals. The RF front end 288 may filter, amplify, and package the analog signals sent by the transmitter 202. Next, the RF front end 288 may cause the one or more antennas 265 to emit electro-magnetic signals containing the data in the ACK to the sending device. For example the communication component 222, the modem 220, the processor 212, the transceiver 202, the transmitter 208, the RF front end 288, and/or the one or more antennas 265 may be configured to or may comprise means for transmitting at least one acknowledgement (ACK) to a sending device, the at least one ACK being based, at least in part, on the received information.

In an optional aspect, the method 1000 may further include aggregating the received information relating to the at least one received communication packet in response to the determination indicating that the data transmission is in a second state.

In an optional aspect, the method 1000 may further include computing a current data rate.

In this optional aspect, the method 1000 may further comprise computing a first quotient of a first difference between a first ACK sequence number at a first time and a second ACK sequence number at a second time and a second difference between the first time and the second time.

In this optional aspect, the method 1000 may further include determining if the data transmission is in the first state by comparing the current data rate to a threshold data rate.

In this optional aspect, the method 1000 may further comprise determining whether the current data rate is less than a second quotient of a peak data rate and a factor.

In an optional aspect, the method 1000 may further include computing an end time of the first state.

In this optional aspect, the method 1000 may further comprise computing a product of a round-trip time between the receiving device and the sending device and a number of round-trips.

In this optional aspect, the method 1000 may further include determining if the data transmission is in the first state by comparing a current time to the end time of the first state.

In this optional aspect, the method 1000 may further include determining a number of previous ACKs generated by the receiving device over a period.

In this optional aspect, the method 1000 may further include aggregating in response to determining that the number of the previous ACKs generated by the receiving device over the period is greater than a threshold.

In an optional aspect, the method 1000 may further include receiving a new communication packet after receiving the at least one communication packet.

In this optional aspect, the method 1000 may further include generating the at least one ACK in response to receiving the new communication packet.

In this optional aspect, the method 1000 may further indicate receptions of the at least one received communication packet and the new communication packet while performing aggregation.

In this optional aspect, the method 1000 may further include discarding a generated ACK corresponding to a second received communication packet while performing the aggregation.

In an optional aspect, the method 1000 may further include detecting an end of the first state.

In this optional aspect, the method 1000 may further include receiving a new communication packet.

In this optional aspect, the method 1000 may further include aggregating a new ACK relating to the new communication packet.

In this optional aspect, the method 1000 may further include determining that the current data rate remains within a percentage range of a rate over an amount of time.

In this optional aspect, the method 1000 may further include determining, in response to determining that the current data rate remains within the percentage range of the rate, that the data transmission is in the second state.

Additional Implementations

Aspects of the present disclosure include methods for receiving at least one transport protocol TP packet, computing a current data rate or an end time of a low throughput phase, determining if TP is in the low throughput phase by comparing the current data rate to a threshold data rate or comparing a current time to the end time of the low throughput phase, aggregating the at least one received TP packet or an ACK relating to the at least one received TP packet in response to determining that the TP is not in the low throughput phase, and transmitting the ACK to a sending device.

Any of the methods above, wherein computing the current data rate further comprises computing a first quotient of a difference between a first ACK sequence number at a first time and a second ACK sequence number at a second time and a difference between the first time and the second time and determining if the TP is in the low throughput phase further comprises determining whether the current data rate is less than a second quotient of a peak data rate and a factor.

Any of the methods above, wherein computing the end time of the low throughput phase further comprises computing a product of a round-trip time between the receiving device and the sending device and a number of round-trips.

Any of the methods above, wherein the number of round-trips is $$\log_2\left(\frac{\text{round-trip time} \times \text{link capacity}}{\text{packet size} \times \text{initial congestion window size}}\right).$$

Any of the methods above, further comprising, in response to determining that the TP is not in the low throughput phase, determining a number of previous ACKs generated by the receiving device over a period, aggregating the ACK in response to determining that the number of the previous ACKs generated by the receiving device over the period is greater than a predetermined threshold, and transmitting the ACK in response to determining that the number of the previous ACKs generated by the receiving device over the period is less than or equal to the predetermined threshold.

Any of the methods above, wherein the predetermined threshold is dependent on a TP throughput.

Any of the methods above, further comprising, in response to determining that the TP is not in the low throughput phase, receiving a new TP packet after receiving the packet, generating a new ACK in response to receiving the new TP packet, and transmitting the new ACK to the sending device to indicate proper receptions of the packet and the new TP packet while performing aggregation.

Any of the methods above, further comprising discarding the ACK instead of transmitting the new ACK.

Any of the methods above, further comprising, in response to determining that the TP is in the low throughput phase, detecting an end of the low throughput phase, receiving a new TP packet, and aggregating a new ACK relating to the new TP packet.

Any of the methods above, further comprising, if the current data is less than the predetermined threshold, determining that the current data rate remains within a predetermined percentage of a stable rate over a predetermined amount of time and determining, in response to determining that the current data rate remains within the predetermined percentage of the stable rate, that the TP is in the low throughput phase.

An example implementation includes a method of wireless communication by a receiving device, comprising temporarily suspending aggregation of received information relating to at least one received communication packet in response to a determination indicating that a data transmission is in a first state and transmitting at least one acknowledgement (ACK) to a sending device, the at least one ACK being based, at least in part, on the received information.

Any of the methods above, further comprising aggregating the received information relating to the at least one received communication packet in response to the determination indicating that the data transmission is in a second state.

Any of the methods above, further comprising computing a current data rate.

Any of the methods above, further comprising computing a first quotient of a first difference between a first ACK sequence number at a first time and a second ACK sequence number at a second time and a second difference between the first time and the second time.

Any of the methods above, further comprising determining if the data transmission is in the first state by comparing the current data rate to a threshold data rate.

Any of the methods above, further comprising determining whether the current data rate is less than a second quotient of a peak data rate and a factor.

Any of the methods above, further comprising computing an end time of the first state.

Any of the methods above, further comprising computing a product of a round-trip time between the receiving device and the sending device and a number of round-trips.

Any of the methods above, further comprising determining if the data transmission is in the first state by comparing a current time to the end time of the first state.

Any of the methods above, further comprising determining a number of previous ACKs generated by the receiving device over a period.

Any of the methods above, further comprising aggregating in response to determining that the number of the previous ACKs generated by the receiving device over the period is greater than a threshold.

Any of the methods above, further comprising receiving a new communication packet after receiving the at least one communication packet.

Any of the methods above, further comprising generating the at least one ACK in response to receiving the new communication packet.

In this optional aspect, the method 1000 may further indicate receptions of the at least one received communication packet and the new communication packet while performing aggregation.

Any of the methods above, further comprising discarding a generated ACK corresponding to a second received communication packet while performing the aggregation.

Any of the methods above, further comprising detecting an end of the first state.

Any of the methods above, further comprising receiving a new communication packet.

Any of the methods above, further comprising aggregating a new ACK relating to the new communication packet.

Any of the methods above, further comprising determining that the current data rate remains within a percentage range of a rate over an amount of time.

Any of the methods above, further comprising determining, in response to determining that the current data rate remains within the percentage range of the rate, that the data transmission is in the second state.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of wireless communication by a receiving device, comprising:
   computing a current data rate;
   determining that a data transmission is in a first state by comparing the current data rate to a threshold data rate;
   temporarily suspending aggregation of received information relating to at least one received communication packet in response to determining that the data transmission is in the first state;
   computing a second current data rate;
   determining that the data transmission is in a second state based on the second current data rate being less than the threshold data rate and the second current data rate remaining within a percentage range of a rate over an amount of time; and
   transmitting, in response to the data transmission being in the second state, at least one acknowledgement (ACK) to a sending device, the at least one ACK being based, at least in part, on the received information.

2. The method of claim 1, further comprising:
   aggregating the received information relating to the at least one received communication packet in response to determining that the data transmission is in the second state; and
   wherein transmitting the at least one ACK includes transmitting based, at least in part, on the aggregating of the received information.

3. The method of claim 2, in response to determining that the data transmission is in the second state, further comprising:
   determining a number of previous ACKs generated by the receiving device over a period;
   wherein aggregating the received information includes aggregating in response to determining that the number of the previous ACKs generated by the receiving device over the period is greater than a threshold; and
   wherein transmitting the at least one ACK includes transmitting in response to determining that the number of the previous ACKs generated by the receiving device over the period is less than or equal to the threshold.

4. The method of claim 3, wherein the threshold is based on a variability of a throughput rate of the data transmission.

5. The method of claim 2, in response to determining that the data transmission is in the second state, further comprising:
   receiving a new communication packet after receiving the at least one communication packet;
   generating the at least one ACK in response to receiving the new communication packet; and
   wherein transmitting the at least one ACK to the sending device indicates receptions of the at least one received communication packet and the new communication packet while performing aggregation.

6. The method of claim 5, further comprising:
   discarding a generated ACK corresponding to a second received communication packet while performing the aggregation.

7. The method of claim 1,
   wherein computing the current data rate further comprises computing a first quotient of a first difference between a first ACK sequence number at a first time and a second ACK sequence number at a second time and a second difference between the first time and the second time; and
   wherein determining if the data transmission is in the first state further comprises determining whether the current data rate is less than a second quotient of a peak data rate and a factor.

8. The method of claim 1, wherein determining that the data transmission is in the first state is based, at least in part, on:
   computing an end time of the first state; and
   determining if the data transmission is in the first state by comparing a current time to the end time of the first state.

9. The method of claim 8, wherein computing the end time of the first state further comprises computing a product of a round-trip time between the receiving device and the sending device and a number of round-trips.

10. The method of claim 1, in response to determining the data transmission is in the first state further comprising:
  detecting an end of the first state;
  receiving a new communication packet; and
  aggregating a new ACK relating to the new communication packet.

11. A receiving device, comprising:
  a memory;
  a transceiver; and
  one or more processors operatively coupled with the memory and the transceiver, the one or more processors configured to:
    compute a current data rate;
    determine that a data transmission is in a first state by a comparison of the current data rate to a threshold data rate;
    temporarily suspend aggregation of received information relating to at least one received communication packet in response to a determination that the data transmission is in the first state;
    compute a second current data rate;
    determine that the data transmission is in a second state based on the second current data rate being less than the threshold data rate and the second current data rate remaining within a percentage range of a rate over an amount of time; and
    transmit, in response to the data transmission being in the second state, at least one acknowledgement (ACK) to a sending device, the at least one ACK being based, at least in part, on the received information.

12. The receiving device of claim 11, wherein the processor is further configured to:
  aggregate the received information relating to the at least one received communication packet in response to a determination that the data transmission is in the second state; and
  wherein to transmit the at least one ACK includes the processor being further configured to transmit based, at least in part, on the aggregating of the received information.

13. The receiving device of claim 12, in response to a determination that the data transmission is in the second state, the processor is further configured to:
  determine a number of previous ACKs generated by the receiving device over a period;
  wherein to aggregate the received information includes the processor being further configured to aggregate in response to a determininination that the number of the previous ACKs generated by the receiving device over the period is greater than a threshold; and
  wherein to transmit the at least one ACK includes the processor being further configured to transmit in response to determine that the number of the previous ACKs generated by the receiving device over the period is less than or equal to the threshold.

14. The receiving device of claim 13, wherein the threshold is based on a variability of a throughput rate of the data transmission.

15. The receiving device of claim 12, in response to a determination that the data transmission is in the second state, the processor is further configured to:
  receive a new communication packet after a reception of the at least one communication packet;
  generate the at least one ACK in response to a reception of the new communication packet; and
  wherein to transmit the at least one ACK to the sending device indicates receptions of the at least one received communication packet and the new communication packet while performing aggregation.

16. The receiving device of claim 11,
  wherein to compute the current data rate the processor is further configured to compute a first quotient of a first difference between a first ACK sequence number at a first time and a second ACK sequence number at a second time and a second difference between the first time and the second time; and
  wherein to determine if the data transmission is in the first state the processor is further configured to determine whether the current data rate is less than a second quotient of a peak data rate and a factor.

17. The receiving device of claim 11, wherein to determine that the data transmission is in the first state is based, at least in part, on the processor being further configured to:
  compute an end time of the first state; and
  determine if the data transmission is in the first state by comparing a current time to the end time of the first state.

18. The receiving device of claim 17, wherein to compute the end time of the first state the processor is further configured to compute a product of a round-trip time between the receiving device and the sending device and a number of round-trips.

19. A non-transitory computer readable medium having instructions stored therein that, when executed by one or more processors of a receiving device, cause the one or more processors to:
  temporarily suspend aggregation of received information relating to at least one received communication packet in response to a determination indicating that a data transmission is in a first state, wherein:
    the determination is based, at least in part, on:
      computing a current data rate; and
      determining if the data transmission is in the first state by comparing the current data rate to a threshold data rate; and
    if the current data rate is less than the threshold data rate:
      determining that the current data rate remains within a percentage range of a rate over an amount of time; and
      determining, in response to determining that the current data rate remains within the percentage range of the rate, that the data transmission is in a second state; and
  transmit at least one acknowledgement (ACK) to a sending device, the at least one ACK being based, at least in part, on the received information.

20. The non-transitory computer readable medium of claim 19, further comprises instructions that, when executed by the one or more processors, cause the one or more processors to:
  aggregate the received information relating to the at least one received communication packet in response to the determination indicating that the data transmission is in the second state; and
  wherein to transmit the at least one ACK includes transmitting based, at least in part, on the aggregating of the received information.

21. The non-transitory computer readable medium of claim 20, further comprises instructions that, when executed by the one or more processors, cause the one or more processors to, in response to the determination that the data transmission is in the second state:
- determine a number of previous ACKs generated by the receiving device over a period;
- wherein to aggregate the received information includes aggregating in response to determine that the number of the previous ACKs generated by the receiving device over the period is greater than a threshold; and
- wherein to transmit the at least one ACK includes transmitting in response to determine that the number of the previous ACKs generated by the receiving device over the period is less than or equal to the threshold.

22. The non-transitory computer readable medium of claim 21, wherein the threshold is based on a variability of a throughput rate of the data transmission.

23. The non-transitory computer readable medium of claim 19, wherein:
- instructions for computing a current data rate further comprise instructions that, when executed by the one or more processors, cause the one or more processors to compute the current data rate the processor is further configured to compute a first quotient of a first difference between a first ACK sequence number at a first time and a second ACK sequence number at a second time and a second difference between the first time and the second time; and
- the instructions for determining if the data transmission is in the second state further comprise instructions that, when executed by the one or more processors, cause the one or more processors to determine whether the current data rate is less than a second quotient of a peak data rate and a factor.

24. The non-transitory computer readable medium of claim 19, wherein the determination is based, at least in part, on:
- computing an end time of the first state; and
- determining if the data transmission is in the first state by comparing a current time to the end time of the first state.

25. The non-transitory computer readable medium of claim 24, wherein instructions for computing the end time of a second state further comprise instructions that, when executed by the one or more processors, cause the one or more processors to compute a product of a round-trip time between the receiving device and the sending device and a number of round-trips.

26. A receiving device, comprising:
- means for temporarily suspending aggregation of received information relating to at least one received communication packet in response to a determination indicating that a data transmission is in a first state, wherein:
  - the determination is based, at least in part, on:
    - computing a current data rate; and
    - determining if the data transmission is in the first state by comparing the current data rate to a threshold data rate; and
  - if the current data rate is less than the threshold data rate:
    - determining that the current data rate remains within a percentage range of a rate over an amount of time; and
  - determining, in response to determining that the current data rate remains within the percentage range of the rate, that the data transmission is in a second state; and
- means for transmitting at least one acknowledgement (ACK) to a sending device, the at least one ACK being based, at least in part, on the received information.

\* \* \* \* \*